United States Patent Office 2,701,796
Patented Feb. 8, 1955

2,701,796

PENICILLIN SALTS OF AMINO SALICYLATES

Walter Grimme, Utfort, Werner Keil, Moers, and Heinrich Schmitz, Moers-Meerbeck, Germany, assignors to Rheinpreussen Aktiengesellschaft für Bergbau und Chemie, Homberg (Niederrhein), Germany, a German corporation No Drawing. Application November 9, 1951,
Serial No. 255,748

Claims priority, application Germany November 16, 1950

3 Claims. (Cl. 260—239.1)

This invention relates to new, improved penicillin salts. It more particularly relates to difficultly soluble penicillin salts of amino salicylates.

Certain penicillin salts, such as the penicillin salts of novacaine (or procaine) are known. These salts are produced, for example, by reacting procaine hydrochloride with the sodium salt of benzyl or n-amyl penicillin in an aqueous solution. This reaction is set forth in Charles I. Salivar, F. Howard Hedger and Ellis V. Brown, Journal of the American Chemical Society, vol. 70, 1948, pages 1287–1288. These known penicillin salts have, in addition to anaesthetizing properties, a prolonged penicillin action.

One object of this invention is penicillin salts having high anaesthetizing action and superior therapeutic properties to the previously known salts. This, and still further objects, will become apparent from the following description:

It has now been found that penicillin compounds of superior therapeutic properties are obtained by the reaction of penicillin with certain amino-salicylates of amino-alcohols.

In accordance with the invention, difficultly soluble crystallized or oily penicillin compounds are produced by reacting a penicillin with an ester obtained from an amino-salicylic acid and an amino-alcohol having the general formula:

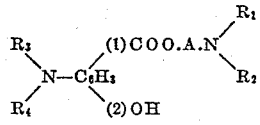

in which $R_1$, $R_2$, $R_3$ and $R_4$ may be any of hydrogen atoms or alkyl, aryl, aryl alkyl or alkyl aryl groups which may contain up to 10 carbon atoms. The $N(R_1)$, $(R_2)$ groups may also be a heterocyclic ring, as, for example, a piperidine ring. The A in the formula represents a straight or branched chain of 2 to 12 methylene groups.

The choice of the alkyl, aryl, aryl alkyl or alkyl aryl hydrocarbon derivative represented by $R_1$ and $R_2$ is not decisive with respect to the final product obtained. It is, however, essential that the number of carbon atoms in these hydrocarbon radicals, including the ring carbon atoms, does not exceed a total of 10 carbon atoms. The alkyl groups may be straight-chained or branched. Suitable alkyl groups are, for example, methyl, ethyl, propyl, isopropyl, n-butyl, hexyl or decyl groups. The aryl groups in accordance with the invention may, for example, be a phenyl group. Examples of aryl alkyl groups which may be used in accordance with the invention include the benzyl group as well as the P-phenyl-ethyl group. Suitable alkyl aryls are, for example, the tolyl group ($CH_3$—$C_6H_4$—) as well as the xylyl group ($CH_3$)$_2$—$C_6H_3$—.

In the formula A represents an aliphatic hydrocarbon radical having a straight or branched chain containing 2 to 12 carbon atoms. Although the size of this carbon chain does not have any essential influence on the pharmacological properties of the final product produced, it has been found advisable for practical purposes to use a radical having not in excess of 5 carbon atoms. It has been found extremely simple to start from esters in which the A group is a dimethylene group —$CH_2$—$CH_2$—. The amino group on the benzene nucleus as set forth in the formula, may be at the 3, 4 or 5 position. It has been found preferable, however, to use esters of 4-amino-salicylic acid.

The amino-salicylic acids may be used in accordance with the invention to include, for example, 4-amino-2-oxybenzoic acid, 5-amino-2-oxybenzoic acid, 4-n-butyl-amino-2-oxybenzoic acid, as well as other isometric amino-salicylic acids.

The amino-alcohols which may be used for the esterification, may, for example, be β-diethyl-amino-ethanol, γ-isobutyl-amino-n-propanol, β-phenylamino-ethanol, β-dibenzyl-amino-ethanol or β-piperidino-ethanol.

The esters of these aforementioned amino-salicylic acids and amino-alcohols, may be reacted in accordance with the invention in the form of their ester bases or in the form of their salts with an inorganic or organic acid.

The penicillin used in accordance with the invention may be any penicillin salt or free penicillin acid.

The new penicillin compound obtained in accordance with the invention by the reaction of these ester bases or salts with the penicillin salt or free penicillin acid, has the general formula

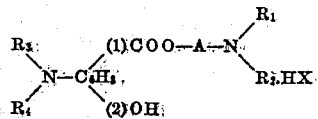

in which HX is any desired penicillin in the form of its acid. The new compound shows a surprising improvement over the previously known procaine penicillin salts and the fundamental antibiotic properties of the penicillin used are not changed.

The penicillin component in accordance with the invention may be any desired penicillin having the general formula:

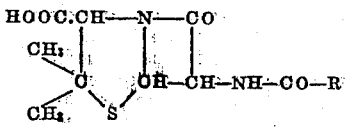

in which R is an organic radical. When penicillin G is used, the R would be represented by a —$CH_2$—$C_6H_5$ (benzyl). When penicillin F is used, the R would be represented by —$CH_2$—$CH$=$CH$—$CH_2CH_3$ (pentenyl). When dihydro-F penicillin is used, the R would be represented by —$CH_2$—$CH_2$—$CH_2$—$CH_2$—$CH_3$ (n-amyl). When penicillin K is used, the R would be represented by —$CH_2$—$CH_2$—$CH_2$—$CH_2$—$CH_2$—$CH_2$—$CH_3$ (n-heptyl).

During the reaction, the penicillin acid group represented by the carboxyl radical, is added to the nitrogen atom of the ester group —COO—A—$N(R_1)R_2$ of the amino-salicylic acid ester. The two reaction components, i. e. the penicillin and the amino-salicylate, are preferably used in equivalent amounts.

The reaction of the penicillin and the amino-salicylate for the preparation of the new penicillin compounds may be effected so that a salt of the amino-salicylate is reacted in water or in an organic solvent with the penicillin salt. The new penicillin compound will then separate out as an insoluble or difficultly soluble substance. The new penicillin compounds in accordance with the invention constitute in part crystalline and in part oily substances. The preparation in accordance with the invention may also be effected in such a manner that the amino-salicylate is brought as a free base into reaction with a penicillin in the form of its acid in a solvent. In connection with these reactions it is preferable to use the amino-salicylate in at least equimolecular quantity. A single amino-salicylate and a single penicillin may be contacted for the reaction in accordance with the invention. It is also possible to use for the new reaction mixtures of these substances.

In addition to the amino-salicylate it has been found that their N-oxides or N-hydroxides in which the aliphatically bound nitrogen is converted into an oxide may be used in accordance with the invention. These N-oxides or N-hydroxides of amino-salicylates should be used in the form of their free bases or their salts, as, for example, the N-hydroxide-diethyl-amino-ethyl-4-amino-salicylate of the formula

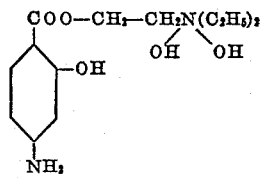

The reaction is effected by the mere contacting of the penicillin and the amino-salicylate, preferably in the presence of solvents. Suitable solvents for use in accordance with the invention are, for example, water, hydrocarbons such as hexane and benzene, halogenated hydrocarbons such as chloroform and secondary butyl chloride, alcohols such as ethanol and isopropanol, esters such as ethylacetate and butylacetate, ethers such as diethyl ether and di-isopropyl ether, ketones such as acetone and methyl ethyl ketone, or mixtures of these solvents.

These new penicillin compounds obtained in accordance with the invention exhibit surprising and unexpected qualities as compared with the previously known penicillin compounds, as for example the penicillin procaine salts. The new compounds exhibit an excellent tolerability and a high anaesthetizing action. The excellent tolerability of these compounds is present in addition to an extremely high penicillin depot action, which renders them especially valuable. In addition, these new penicillin compounds have therapeutically valuable properties which cannot be obtained in the same manner with other compounds of penicillin. Thus, for example, with the use of the penicillin compound of the diethyl amino-ethyl ester of 4-amino-salicylic acid there is obtained, in addition to an anaesthetizing action superior to that of penicillin-procaine, an additional specific tuberculostatic action which valuably supplements the bacteriostatic action of the penicillin. The penicillin compounds of the dialkyl-amino-ethyl esters of 4-n-butylamino-salicylic acid excel by their extremely high anaesthesizing action which is far superior to that of the penicillin-procaine compounds. In addition, these compounds have a considerably better tolerability than the penicillin compounds of the corresponding derivatives of p-amino-benzoic acid, as, for example, those of pantocaine (4-n-butylamino benzoic acid dimethyl-amino-ethyl ester).

The new compounds in accordance with the invention are characterized in part by their difficulty in dissolving. In this way, these compounds may be obtained from penicillin or their salts of low concentration and/or low purity in a good yield and in a form which may be used for therapeutic purposes. This enables the discarding of a large number of enrichment and purification stages which are otherwise customary in the industrial preparation of penicillin.

The following examples will serve to illustrate methods for the preparation of the new penicillin compounds and are given solely for illustration and not limitation:

Example 1

To a solution of 4.57 grams penicillin-G-sodium in 5 cc. of water there is added a solution of 3.70 grams of the hydrochloride of the β-diethyl amino ethyl ester of 2-oxy-4-amino benzoic acid in 20 cc. of water. After a short time, at a temperature of 5° C. the crystallization of the penicillin G salt of the β-diethyl amino ethyl ester of the 2-oxy-4-amino benzoic acid begins. The pure white product is filtered, washed with water and dried, and observed to have the following characteristics:

Melting point: 111–113° C. (decomposition)
Solubility in water at room temperature: 0.75%
Analysis: $C_{29}H_{38}O_7N_4S$
Computed: N, 9.55%; S, 5.46%
Found: N, 9.37%; S, 5.78%

Example 2

1.8 grams penicillin-G-potassium is dissolved in 40 cc. of water, and 2 N sulfuric acid is added to the solution until an acid reaction with Congo-red is obtained. The penicillin G which precipitates is isolated by shaking with 50 cc. of ether. The etherial solution is added to a solution of 1.25 grams of β-diethyl-amino-ethyl 2-oxy-amino-benzoate base in 20 cc. of ether. There is obtained the penicillin salt described in Example 1.

Example 3

4.66 grams of β-piperidino-ethyl 2-oxy-4-amino benzoate hydrochloride are dissolved in 150 cc. of water. The solution is added to the solution of 5.55 grams of penicillin G sodium in 10 cc. of water. After setting aside in a refrigerator for several days, the crystalline reaction product which has precipitated out is filtered off. By concentration of the mother liquor in a vacuum there are obtained further quantities of the product, having the following characteristics:

Melting point: 204–206° C. (decomposition)
Analysis: $C_{30}H_{38}O_7N_4S$
Computed: N, 9.36%; S, 5.35%
Found: N, 9.54%; S, 5.15%

Example 4

5.17 grams penicillin-G-sodium are dissolved in 100 cc. of water and to the solution there is added 2 N sulfuric acid until there is a clear acid reaction to Congo-red. The oily penicillin G which separates out is isolated by extracting twice, each time with 100 cc. of ether. The ether solution thus obtained is added to a solution of 3.60 grams β-diethyl amino-ethyl 5-amino-2-oxybenzoate-base in 20 cc. of ether. The penicillin G salt of this ester base separates as an oil. The product is dried by dissolving the oil in dioxane and evaporating the solvent in vacuum. The product has the following properties:

Analysis: $C_{29}H_{38}O_7N_4S$
Computed: N, 9.55%
Found: N, 9.48%

Example 5

In 20 cc. of water there are dissolved 3.45 grams of β-diethyl-amino-ethyl 2-oxy-4-n-butyl-amino hydrochloride, and this solution is added to a solution of 3.65 grams penicillin K-sodium in 5 cc. of water. The penicillin K-salt of the β-diethyl-amino-ethyl 2-oxy-4-n-butyl-amino benzoate separates out as an oil which is dried by triturating with benzene and evaporation in a vacuum at 30° C. The product has the following properties:

Analysis: $C_{33}H_{54}O_7N_4S$
Computed: N, 8.61%; S, 4.91%
Found: N, 8.40%; S, 4.68%

Example 6

4.91 grams of the hydroxide of β-diethyl-amino-ethyl 2-oxy-4-amino benzoate having a melting point of 133° C. are dissolved in 17.1 cc. of 1 N hydrochloric acid. To this there is added a solution of 6.14 grams penicillin G sodium in 10 cc. of water. The reaction product is obtained in the form of a viscous oil. After washing with water, it is dissolved in dioxane and obtained in dry form by evaporating the solvent in a vacuum. It has the following properties:

Analysis: $C_{29}H_{40}O_9N_4S$
Computed: N, 9.02%; S, 5.16%
Found: N, 8.89%; S, 5.01%

Example 7

3.0 grams of (γ-isobutyl-amino)-n-propyl 2-oxy-3-amino benzoate hydrochloride are dissolved in 15 cc. of water. To this there is added the solution of 3.6 grams penicillin-G-sodium in 5 cc. of water. The reaction product separates in the form of an oil. It is agitated with benzene after removal of the water and dried by evaporation in vacuum at 30° C.

Analysis: $C_{30}H_{40}O_7N_4S$
Computed: N, 9.33%; S. 5.33%
Found: N, 9.18%; S, 5.51%

Example 8

3.7 grams of (α,β-dimethyl-γ-diethyl-amino)-n-propyl 2-oxy-4-n-propylamino-benzoate hydrochloride of the formula

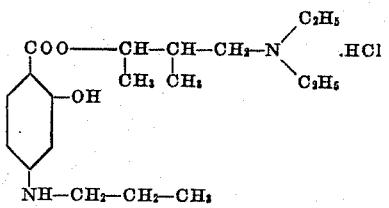

are dissolved in 20 cc. of water. To this there is added the solution of 3.6 grams penicillin-G-sodium and 5 cc. of water. The oily penicillin G salt of the above ester base which is obtained is separated, washed with a small amount of water, and, after the addition of benzene, dried by evaporation in a vacuum.

Analysis: $C_{35}H_{50}O_7N_4S$
Computed: N, 8.36%; S, 4.77%
Found: N, 8.20%; S, 4.58%

*Example 9*

A butyl acetate extract of a penicillin-containing culture liquid which contains 10,220 international units of penicillin per cc., is treated with a butyl acetate solution of β-diethyl-amino-ethyl 2-oxy-4-amino benzoate, so that for each 10,000 international units of penicillin there are 4 milligrams of the aforesaid ester. From the combined solutions there precipitates, after cooling to 5° C., the crystalline, pure white penicillin compound of the aforementioned ester, which is separated by filtration, washed with water and ether, and dried at 37° C. In this manner there is obtained a therapeutically valuable penicillin compound having a purity of 960 I. U. per milligram, corresponding to a 95% yield from the butyl acetate extract.

We claim:

1. As new chemical compounds, penicillin salts of aminosalicylates having the general formula

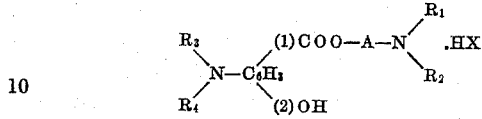

in which HX is penicillin in the form of its acid; $R_1$, $R_2$, $R_3$, and $R_4$ are each a radical containing not in excess of 10 carbon atoms and selected from the group consisting of hydrogen, and alkyl groups; and A is a saturated aliphatic hydrocarbon radical having 2 to 5 carbon atoms.

2. Penicillin salt according to claim 1, in which $R_1$ is a methyl group, $R_2$ is a methyl group, $R_3$ is a normal butyl group, $R_4$ is hydrogen and A is $C_2H_4$.

3. Penicillin salt according to claim 1, which, in the general formula $R_1$ is an ethyl group, $R_2$ is an ethyl group, $R_3$ is hydrogen, $R_4$ is hydrogen and A is $C_2H_4$.

References Cited in the file of this patent

UNITED STATES PATENTS

| | | |
|---|---|---|
| 2,515,898 | Rhodehamel | July 18, 1950 |
| 2,547,782 | Rhodehamel | Apr. 3, 1951 |

OTHER REFERENCES

Ballaro: "Ciencia e Investigacion," vol. 4, p. 481, November 1948.

Squibb Abstracts, vol. 24, November 28, 1951, p. A-1184.